F. W. C. SCHNIEWIND.
COKE OVEN AND HEATING ARRANGEMENT THEREFOR.
APPLICATION FILED OCT. 24, 1907.

976,930.

Patented Nov. 29, 1910.
6 SHEETS—SHEET 2.

Fig. 2.

F. W. C. SCHNIEWIND.
COKE OVEN AND HEATING ARRANGEMENT THEREFOR.
APPLICATION FILED OCT. 24, 1907.

976,930.

Patented Nov. 29, 1910.

WITNESSES:

INVENTOR

BY his ATTORNEY.

THE NORRIS PETERS CO., WASHINGTON, D. C.

F. W. C. SCHNIEWIND.
COKE OVEN AND HEATING ARRANGEMENT THEREFOR.
APPLICATION FILED OCT. 24, 1907.

976,930.

Patented Nov. 29, 1910.

WITNESSES:
John E. Hubbell

INVENTOR
Francis W. C. Schniewind
BY
his ATTORNEY.

THE NORRIS PETERS CO., WASHINGTON, D. C.

UNITED STATES PATENT OFFICE.

FREDERIC W. C. SCHNIEWIND, OF NEW YORK, N. Y.

COKE-OVEN AND HEATING ARRANGEMENT THEREFOR.

976,930.                    Specification of Letters Patent.    Patented Nov. 29, 1910.

Application filed October 24, 1907. Serial No. 398,902.

*To all whom it may concern:*

Be it known that I, FREDERIC W. C. SCHNIEWIND, a citizen of the United States of America, residing in the city, county, and State of New York, have invented a certain new and useful Improvement in Coke-Ovens and Heating Arrangements Therefor, of which the following is a true and exact description, reference being had to the accompanying drawings, which form a part thereof.

The object of the present invention is the provision of apparatus by which coal may be coked in a manner much more advantageous than that heretofore practiced. This is accomplished in part by the novel arrangements which have been devised for heating the plurality of retorts forming a single battery or operative unit, for charging each retort, and for removing from each retort both the fluid and solid products of the coking operation, and in part by the relatively large retorts the use of which is facilitated by the charging and discharging apparatus, and particularly the heating arrangement disclosed herein.

The particular apparatus hereinafter described embodies retorts each of which is large enough to coke at one operation coke sufficient to load one railroad coke car of the usual capacity, say twenty one tons or upward. Heretofore, in apparatus of this kind the largest retort employed would not produce at one operation more than about eight tons of coke.

In the preferred form of apparatus disclosed by the drawings of this application the retorts are horizontally elongated and deep, but are narrow in the direction of the battery, and the retorts proper are open at top and bottom so that the coal may be readily and uniformly charged at the top and along the entire length and width of the retort, and the coke may be readily discharged at the proper time through the bottom of the retort. Removable top and bottom walls or covers close the retort during the coking operation. With the heating system employed, the depth of the retorts is only limited by the strength of the brick work, and the length of the retort by the convenient dimensions of the coal charging and coke discharging apparatus. The thickness of the retorts is limited by the heating requirements. If retorts are made too thick it is, of course, difficult to transfer sufficient heat from the walls of the retort to the center of the coal body.

The novel heating system employed is characterized by an advantageous arrangement in the spaces between each adjacent pair of retorts of the heating devices by which one or both of the air and gas components uniting in combustion may be preheated. It is further characterized by the provisions for not only obtaining uniform heat conditions in one retort with respect to the other retorts, but also for obtaining uniform heat conditions in all portions of each retort.

The desired uniformity in heating is obtained by the provisions for insuring uniformity of gas pressure at the various burners, by the provisions for insuring uniform draft and air admission pressures, and by the provisions for insuring relatively short paths of substantially uniform length for the gases flowing through the various heating flues. The heating system is further characterized by the division of the heating apparatus for various ovens of a single battery or unitary coke oven structure into relatively small units which can be individually controlled both as to the gas and air supply and as to the draft conditions. The invention is also preferably characterized by the provision of straight heating flues, and the means for positively causing combustion to take place in each flue, and alternately at opposite ends thereof.

By heating all the retorts alike a uniform output from all the various retorts of the battery is insured, and by heating the various portions of each retort uniformly, the products formed in the various portions of one retort are made uniform. With uniform heating, unequal expansion or contraction of the masonry walls of the retort is avoided, and the coking action may be made more rapid than heretofore, since the average temperature may be raised. Heretofore, the average temperature has been kept down to avoid injury to the masonry by excessive local temperatures at some point or another of the oven structure which might otherwise occur. The avoidance of unequal expansion and contraction of different portions of the oven structure, is of course highly desirable. For one thing, it avoids the cracking of the oven walls which would otherwise occur, with the result of admitting air to the coking chambers, causing combustion of the coke, and with the result of mixing heating flue gases with the volatile products recovered. The sub-division of the heating system for one coke oven structure or battery of ovens into units of small sizes is of advantage in facilitating the charging and discharging of individual retorts. It permits individual retort walls or portions of the masonry structure to be readily repaired without shutting down the entire coke oven or subjecting the repairers to extremely high temperatures. Furthermore, it permits the heat conditions of individual retorts to be independently regulated so that the heat supplied at various stages in the operation of coking one charge may be varied. It will be understood that the various retorts of one battery are charged and discharged successively, and that without individual regulation of the heat for one retort or one small group of retorts it is not practical to regulate the heating of the retorts in accordance with the various requirements for heat at different stages of the coking operation carried on in each retort.

In addition to the advantages above enumerated, the invention possesses numerous others, some of which are specifically pointed out in the attached specification, and others of which will be readily apparent to those skilled in the art.

It has been my aim to point out with particularity in the claims annexed to and forming a part of this specification the various features of novelty which characterize the invention. For a better understanding of the invention, however, reference may be had to the accompanying drawings and descriptive matter in which I have illustrated and described forms in which the invention may be embodied.

Figure 1:
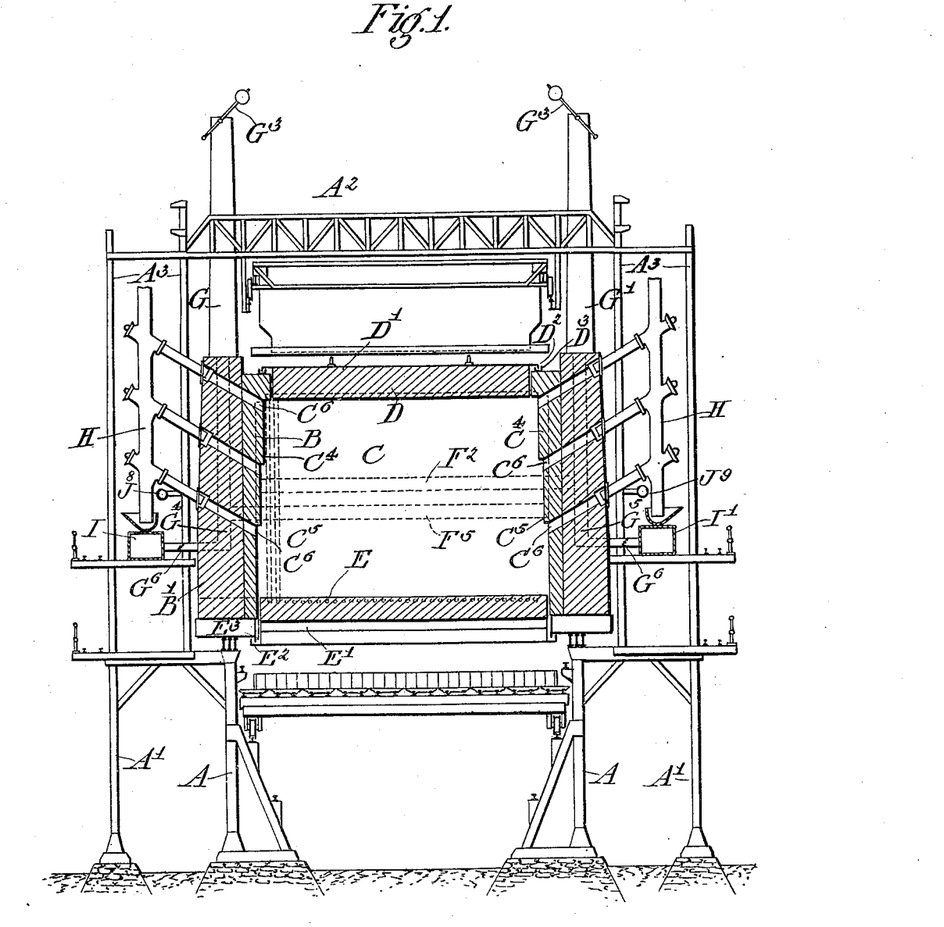
Figure 1 is a sectional elevation through one of the retorts on a plane parallel to one end of a battery or structure embodying one form of the invention.
Figure 2:
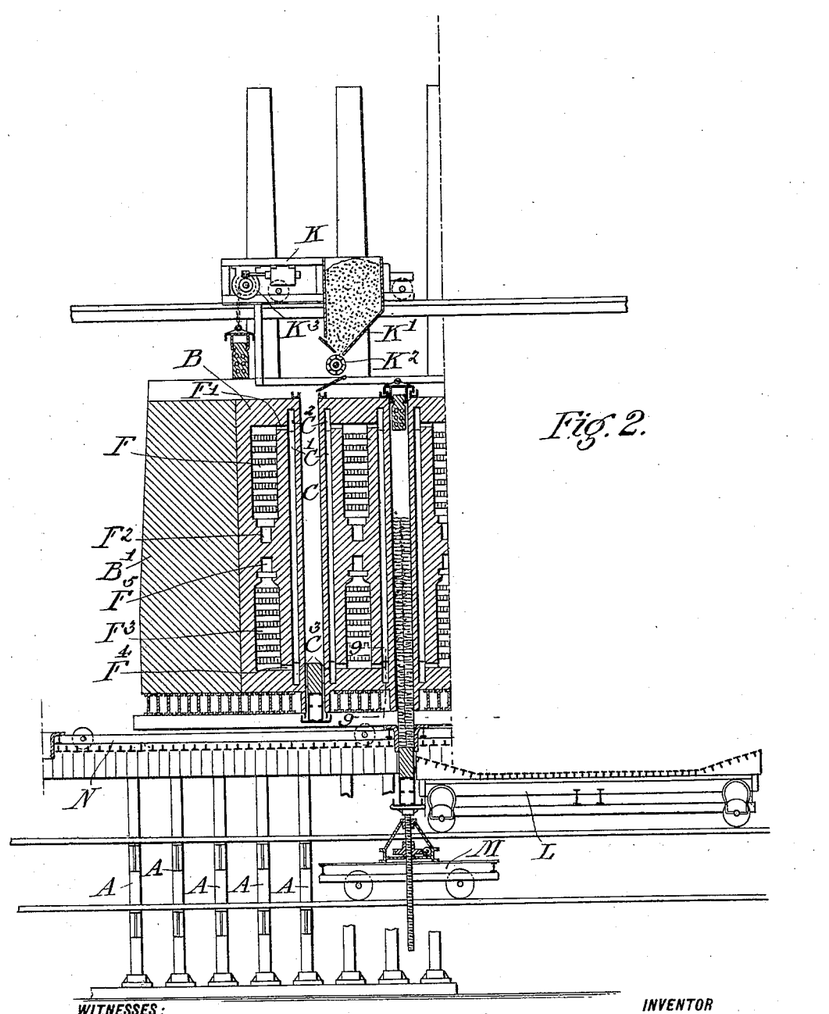
Fig. 2 is a partial sectional elevation taken at right angles to Fig. 1.
Figure 3:
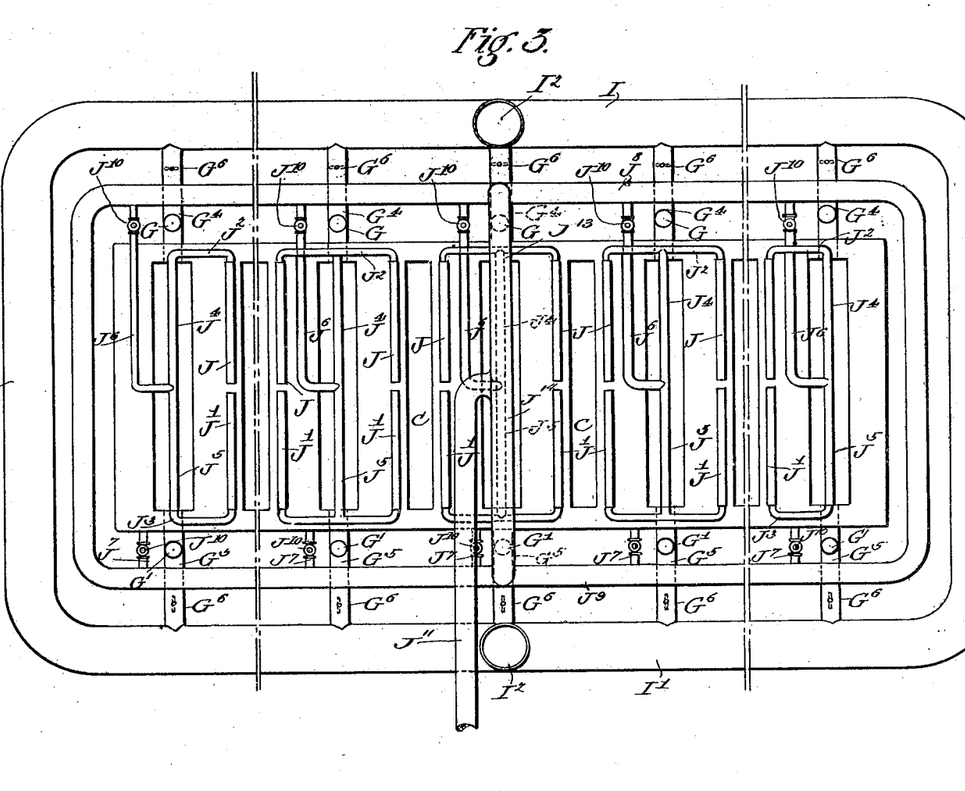
Fig. 3 is a diagrammatic view illustrating the gas and air circulation of the heating system.

In the constructions shown in the drawings, referring particularly to Figs. 1, 2, and 3, A and A' represent metal columns which support the masonry work of the ovens, and also through the structural metal work $A^3$ the overhead trusses or bridges $A^2$. The various devices for charging and discharging the retorts are mounted on carriages running on tracks supported by the structural metal work independently of the furnace. The relatively open arrangement obtained by the use of the structural metal framework and the arrangement of the carriage tracks on such framework facilitates the various operations necessary to be performed in conjunction with the furnace, though it will be understood that as far as many features of the present invention are concerned these arrangements may be varied, for instance the ovens and also the various carriages may be supported on masonry. The masonry structure in the form shown comprises the inner firebrick portion B which forms the walls of the retorts, heating flues, regenerators, etc., and an inclosing shell of masonry B'. The coking retorts C formed in the framework B are arranged side by side and extend transversely to the length of the battery proper. Each retort C is generally rectangular in shape, though by preference there are forebays $C^4$ and $C^5$ extending over the lower two of the three gas escape vents $C^6$ formed at each end of the coking chamber. Also, with coals which expand in coking the sides of the retorts should be inclined with their tops closer together than their bottoms, thereby facilitating the removal of the coke. The top wall of each retort is removable, and comprises a body portion D which may be made out of one or more fire-clay tiles or brick. This body portion is connected to and supported by a metal cap portion D' provided with a downwardly extending flange $D^2$ which dips into the groove formed in the metal rim $D^3$ surrounding the upper end of the retort. Similarly, the bottom wall of the retort is removable and comprises an inner body portion E, preferably formed of fire-brick, tile, or the like, and an outer metal cap portion E' which may have a grooved rim $E^2$ into which the rim flange $E^3$ extends when the bottom wall is in place. The purpose of the flanges $D^2$ and $D^3$ and the corresponding grooves or troughs into which they extend is to form a seal, which may be completed by fluid, pulverulent material such as sand, or a luting of clay or the like.

No claim is made herein to the special construction of movable top and bottom walls or retort doors disclosed, as they form the subject matter of my co-pending application, Serial No. 398,904, filed of even date herewith.

Each retort has at each side a set of parallel vertical heating flues C' which extend between the top and the bottom edges of the retort. These heating flues are connected at their upper ends with horizontal burner chambers $C^2$, and at their lower ends with horizontal burner chambers $C^3$. The upper ends of each set of flues C' are also connected by passages F' to the upper one of a pair of regenerators F and $F^3$ arranged one above the other at each side of each retort. The regenerators $F^3$ are connected to the lower ends of heating flues C' by passages $F^4$.

In the construction shown in Figs. 1 and 2, each of the intermediate sets of regenerators are connected to the adjacent heating flues of the two retorts at each side of the regenerator. The upper regenerators F are each provided at its lower end with a horizontal inlet-outlet passage $F^2$ through which air enters the regenerator or the waste gases escape according to the direction of flow of the heating gases. Similarly, the lower regenerators $F^3$ are provided at their upper sides with horizontal inlet-outlet passages $F^5$. There are a pair of chimneys or smoke stacks G and G' for each pair of upper and lower regenerators. The chimneys G are located at one side and the chimneys G' at the other side of the battery. The inlet-outlet passage $F^2$ of each upper regenerator is connected to the corresponding chimney G', and the passage $F^5$ of the lower regenerator to the corresponding chimney G at the opposite side of the battery. Each of the chimneys G and G' is provided at its upper end with a damper or valve $G^3$, and each has a pipe connection $G^4$ or $G^5$ to one or the other of the air boxes or supply pipes I and I' arranged on opposite sides of the battery. Each connection $G^4$ and $G^5$ is controlled by a damper or valve $G^6$.

Figure 9:
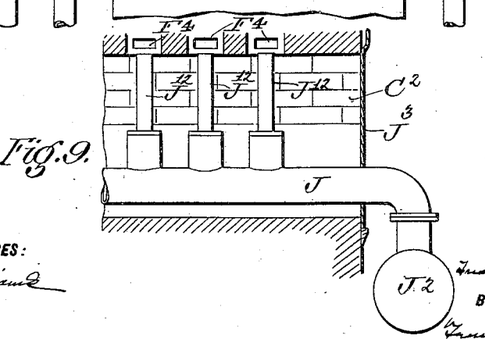
Fig. 9 is a partial sectional elevation taken on the line 9—9 of Fig. 2 showing one form of burner construction which may be employed.

In the construction illustrated and described, there are two burners J and J' inserted in each of the burner chambers $C^2$ and $C^3$. Each of the burners is half as long as the burner chamber which runs the full length of the retort, and the two burners in one burner chamber are inserted from opposite ends. Preferably, each burner has a gas jet or nozzle $J^{12}$ for each adjacent flue, as shown clearly in Fig. 9. The burners J and J' are preferably made readily removable. They may be provided with wheels running on a suitable track which with the lower burners may be the bottom wall of the burner chamber, as shown in Fig. 9. Each burner may also have attached to it a burner chamber door $J^3$ as shown in Fig. 9. With the arrangement of burners described each burner may be quickly removed when adjustment or repair is necessary and an extra burner inserted, thus avoiding material interruption in the operation of the furnace. The adjustment referred to may be had by means of a controlling perforated plate or diaphragm in each burner nozzle and controlling the gas flow therethrough, as in the burner construction disclosed and claimed in my co-pending application, Serial No. 398,900 filed of even date herewith. In so far as this aspect of the invention claimed herein is concerned, however, it is merely desirable that there should be some suitable kind of an adjustable burner nozzle adjacent each end of each heating flue.

Figure 10:
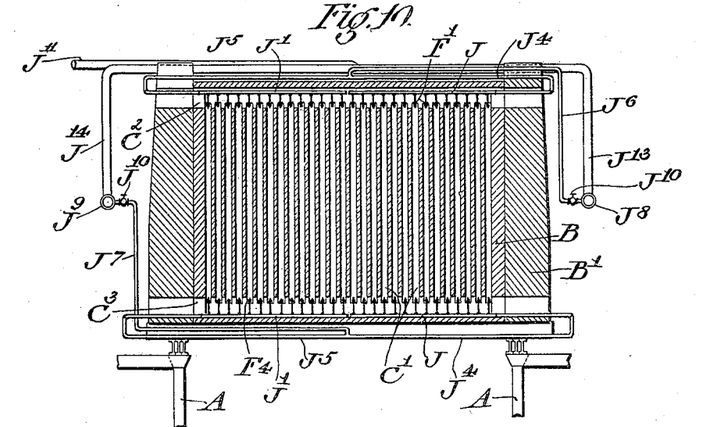
Fig. 10 is a partial sectional elevation, taken parallel to Fig. 1, but through the heating flues at one side of one of the retorts.
Figure 11:
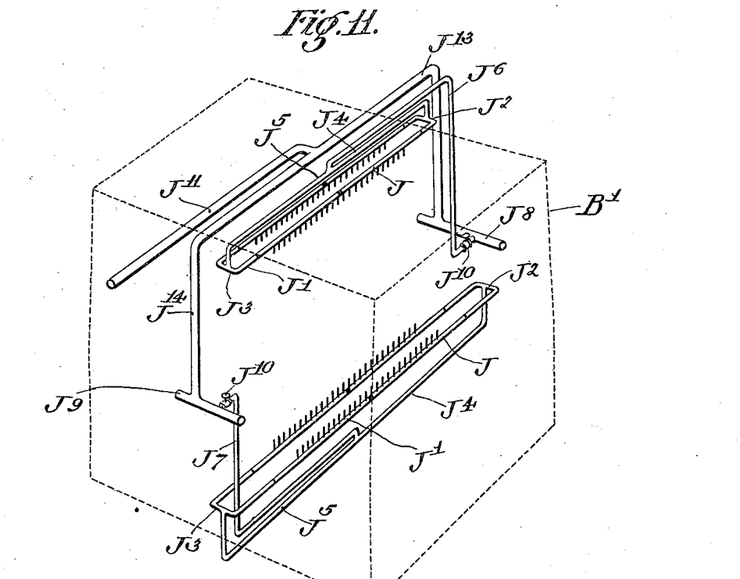
Fig. 11 is a diagrammatic perspective view showing the burners and gas piping for the burners of one of the retorts and the general arrangement of the burners, and piping relative to the brick work structure of the battery, which is shown in dotted lines.

To insure uniformity in the gas supply for each flue, the burners are preferably connected to the gas supply main in the following manner, reference being had to Figs. 3, 10 and 11: The upper burners J at the opposite sides of each intermediate regenerator chamber F are connected by a pipe $J^2$, and the corresponding burners J' by a similar pipe $J^3$. Pipes $J^4$ and $J^5$ run from the centers of the pipes $J^2$ and $J^3$ respectively over the top of and to the center line of the battery where they unite with a pipe $J^6$ which is connected through a valve $J^{10}$ to the distribution main $J^8$ running parallel to the length of the battery and located preferably midway between its top and bottom edges. The corresponding burners J and J' in the chambers $C^3$ at the lower ends of the heating flues are similarly supplied with gas through pipes $J^7$ and valve $J^{10}$ from a distribution main $J^9$ similar in arrangement to the distribution main $J^8$. The distribution mains $J^8$ and $J^9$ preferably unite to form a closed conduit running around the battery, and gas is supplied to this distribution main from a supply pipe $J^{11}$ which leads to the top of the battery at its center through two similar pipe connections $J^{13}$ and $J^{14}$. The connections to all the burners J and J' are the same except that at the ends of the battery there are only four burners in a set and consequently the corresponding pipes $J^6$ and $J^7$ may be smaller than the intermediate pipes $J^6$ and $J^7$. By preference, the air boxes or distribution mains I and I' are similarly united to form a closed conduit extending around the battery, and air is supplied to these pipes at suitable points as by diametrically opposed pipe connections $I^2$.

It will be understood that the various air and gas pipes are arranged close to the outer masonry shell B' of the battery, particularly at the top and bottom of the shell to avoid interference with the charging and discharging apparatus, and that the piping above and below the shell B' is located between and not in line with the movable top and bottom walls of the retorts.

The operation of the heating system is as follows: With one direction of flow through the heating flues, the dampers $G^3$ at the upper ends of one set of stacks, say G', are closed, and at the same time the valves $G^6$ in the air pipe connection $G^5$ are opened, as are the valves $J^{10}$ in the pipes $J^6$ running to the upper burners J and J' located at the upper ends of the heating flues C'. At the same time the dampers $G^3$ in the stacks G are opened, and the valves $G^6$ in the air pipe connections $G^4$ and the valves $J^{10}$ in the gas supply pipes $J^7$ are closed. Preferably, each damper or valve $G^3$ and the corresponding valve $J^{10}$ and damper $G^6$ are connected together for simultaneous operation, and all the dampers or valves may also be connected for alternate operation if thought desirable. The connections should not be of a character, however, to prevent adjustment of individual valves.

With the valves opened or closed as above described, air flows from the air box I' through each connection $G^5$ to the corresponding stack G' and inlet-outlet passage $F^2$, from which it flows through the checker work of the regenerators F to the upper ends of the adjacent heating flues C' through the passages F'. The air, which is heated by passing through the heated checker work of the regenerator unites in combustion with the gas supplied by the burners in the burner chambers $C^2$, and the products of combustion pass through the heating flues C' and flow from the lower ends thereof into the lower end of the corresponding regenerator chamber $F^3$ to the inlet-outlet passage $F^5$ at the upper edge of the latter, from whence the gas escapes to the stack G. In passing through the checker work of the regenerator $F^3$ the heat is of course extracted by the regenerator walls from the gas. It will be observed that with the system described, the gas paths through the various heating flues between the external connections (chimney connections) of the two regenerator chambers of each heating unit are all of equal length. This, of course, insures a uniform flow through the various heating flues, and as the gas which combines with the air in combustion is supplied at uniform pressure at the entrance of each flue, and as the paths traveled by the gas components of the products of combustion are all of substantially the same length, uniform heating in all of the flues of one set is readily obtained. Moreover, as the arrangements described for supplying air to the inlet passages $G^4$ and $G^5$ and gas to the gas inlet pipes $J^6$ and $J^7$ insure practically uniform pressures in each set of inlet passages or flues, the different sets of flues for the various retorts may all be uniformly heated. It should be remarked that when air and gas are being supplied to the upper regenerators and burners, gas and air will flow through the distribution mains $J^9$ and I around the ends of the battery into the ends of the pipes $J^8$ and I', and conversely when the upper burners are in operation, so that without unduly increasing the size of the pipes $J^8$ and $J^9$, I and I', uniform pressures at all points are insured. After the downward flow through the heating flue has been continued for a predetermined time, say twenty or thirty minutes, the dampers or valves $G^3$ in stacks G, $G^6$ in connections $G^4$, and $J^{10}$ in pipes $J^6$, are closed, and the other dampers or valves are opened. This gives an upward flow of the heating gases through the flues C', which is exactly similar in character to the downward flow previously described.

Figure 4:
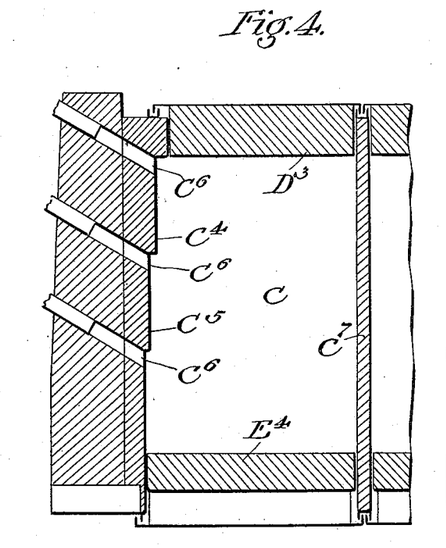
Fig. 4 is a view taken similarly to Fig. 1, showing a portion of a modified retort construction.
Figure 5:
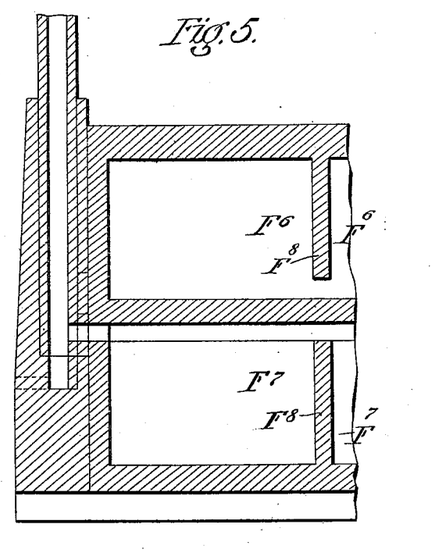
Fig. 5 is a sectional elevation taken through the regenerator chambers on a plane parallel to the end of the battery and showing a portion of a modified construction.

In the apparatus shown in Figs. 1 and 2, it will be observed that the battery is provided with a set of heating units each of which includes an upper and lower regenerator, a pair of stacks, and the heating flues at adjacent sides of adjacent retorts, and it is one of the advantages which this system possesses that the heating systems may remain entirely unchanged even though each retort C is divided into two or more parts by partition walls $C^7$, as shown in Fig. 4, where such subdivision is rendered desirable as in order to facilitate the operation of the oven by dividing the removable top and bottom walls into sections $D^3$ and $E^4$, each of which may be generally similar to the undivided top and bottom walls of the construction shown in Figs. 1 and 2. The heating system may also be modified as shown in Fig. 5 by dividing each upper and lower regenerator chamber into sections $F^6$ and $F^7$ respectively by a wall or walls $F^8$ placed between the end walls of the regenerator or, as shown in Fig. 6, by dividing the upper and lower regenerator chambers into sections $F^{10}$ and $F^{11}$ respectively by division walls $F^9$ which extend midway between and parallel to the side walls of the regenerator.

Figure 6:
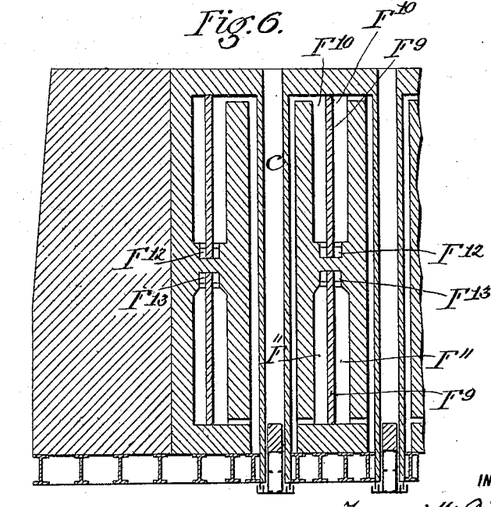
Fig. 6 is a section taken similarly to Fig. 2, but showing another modification of the regenerators.
Figure 7:
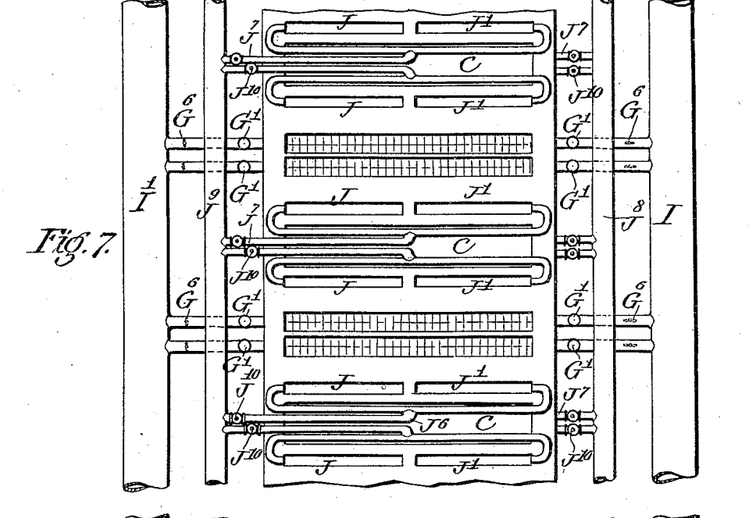
Figs. 7 and 8 are diagrams generally similar to Fig. 3, but showing different arrangements of the air and gas admissions.

With the modification shown in Fig. 6, each of the portions $F^{12}$ and $F^{13}$ into which the inlet-outlet passages of the regenerators are divided may be provided with a separate chimney connection and corresponding separate burner connections if it is desired to make the heating unit for each set of flues entirely independent of the heating unit for any other set of flues, as shown in Fig. 7. In this case the burners at the two ends of each flue are provided with separate gas supply pipes and controlling valves as shown.

Figure 8:
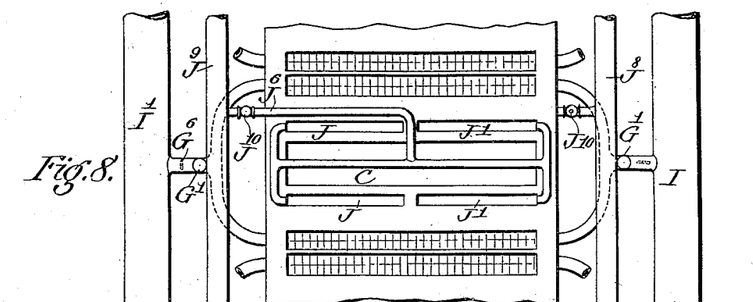

In the arrangement shown in Fig. 8 the two adjacent sections of the two regenerators at the sides of each retort are united and provided with a single chimney and air connection at each end of the retort. In this form the burners J and J' for the two sets of flues at the sides of each retort are also connected for unitary operation and regulation.

It will be observed that with the arrangement shown best in Fig. 2, as well as with that shown in Fig. 6, the inlet-outlet passages are separated from the adjacent heating flues by walls which are thicker than those supporting the body of the regenerator from the heating flues. This of course is desirable to prevent the flow of heat from the heating flues through the walls to the entering air, and to prevent such cross flow the walls supporting the body of the regenerator from the heating flues should also be made thick. With the arrangement shown, however, the desirable thickness of wall can be readily obtained, and of course it will be understood that any heat diverted from the flues to the regenerator is immediately returned by the air passing into the flues.

The high average heating effect of the flues possible with uniformity of heating in the various flues diminishes the time of coking, which results directly in an improved quality, and, to some extent, quantity, of the by-products recovered. Furthermore, the uniformity of heating gives a uniform coke product, all portions of each charge coming "around" at the same time; especially, it avoids the blackened edges which have heretofore been experienced on account of inferior heating of the edges of the coke body. Also, there is no likelihood of overheating any portion of the coke and thereby rendering it brittle. Another advantage in the uniformity in the heating system and the uniformity of the gas and air admission pressures is found in the fact that thereby the pressures in all the heating flues are uniform, thus facilitating the desired relations between the pressures in the retorts and in the heating flues at the sides of the retorts. Also, it will be observed that with the arrangements made there is no chance for an accumulation of fuel in any of the burner chambers at the time of reversal or otherwise with the consequent danger of explosion.

While the heating system has been described as for the use of gaseous fuel, it will be understood that oil or even powdered solid fuel may be employed as fuel. The uniformity in the heating conditions of course results in an economy of fuel.

The charging apparatus is located on a carriage K running on track rails supported by the overhead bridges A². The charging parts include a coal lorry K' and a feed roll K², the coal hopper of the lorry and feed roll running along the entire width of the battery so that each retort is charged evenly along its entire length. If desired, suitable stamping or other devices for compacting the coal in the retorts may be mounted on the carriage K. The carriage K is also provided with hoisting apparatus K³ adapted to lift the removable top walls or covers D from the tops of the retorts, as shown in Fig. 2, and to replace the removed walls or covers when the charging operation is completed.

No claim is made herein to the particular charging apparatus disclosed, as this apparatus forms the subject matter of my copending application, Serial No. 398,903 filed of even date herewith.

By charging each retort to the proper height the top wall of the retort may bear on the charge during the coking operation, thus producing a denser coke and avoiding the formation of a space in the hot portion of the retort in which the volatile products may collect and be injured by the continued exposure to high heat.

Underneath the ovens is located the carriage L, which forms the receiver upon which the coke is dicharged from the retorts successively as the lower walls are removed as by the mechanism located on the carriage M. A carriage or carriages M provided with fireproof covers for the coke discharged on the coke receiver may also be employed. These covers serve to protect the furnace proper and the structural work supporting it from the incandescent coke on the receiver. After the coke from each retort is discharged on the receiver it may be removed to a quenching station at the end of the battery for quenching and may then be loaded into cars for transportation or placed in other coke receptacles.

No claim is made herein to the discharging and receiving apparatus disclosed by this application, as such apparatus forms the subject matter of my co-pending application, Serial No. 398,901, filed of even date herewith.

The various retorts are intended to be charged and discharged successively from one end to the other of the battery so that in adjacent retorts the coking operations are at nearly the same stages throughout almost the entire period of operation.

The general construction of a coke oven structure possesses some important advantages in construction and operation. There is an avoidance of all underground flues. The overhead charging and under oven discharging of the retorts makes these operations comparatively simple, and permits a more careful inspection and control of them. At the same time it permits the charging and discharging operations to be carried out in ways which do not injure the oven walls. Individual portions of the oven structure may be repaired without shutting down the battery as a whole, and the thick walls and regenerator spaces between adjacent retorts permit the repairs to be made without subjecting the repairers to oppressive temperature conditions.

The structural arrangement and the use of large capacity retorts economize ground space and reduce the labor charges. Moreover, the operators work under more favorable conditions than those heretofore experienced, as in all the regular operations of charging and discharging the retorts, etc., the attendants may be so located as to avoid excessive temperatures.

While the various novel features of construction and arrangement disclosed are all designed and adapted for conjoint use, it will be apparent to those skilled in the art that certain features of the invention may sometimes be employed with advantage without a corresponding use of other features, and also that many changes may be made in the form of the invention without departing from its spirit. For instance, in some cases recuperators may be employed in place of regenerators.

Having now described my invention, what I claim as new and desire to secure by Letters Patent is:

1. A coke oven structure comprising a continuous masonry body portion having formed in it a plurality of horizontally elongated and deep coking chambers, each of capacity to produce twenty tons or more of coke per charge, arranged side by side, and having removable top and bottom walls for each chamber, whereby each chamber may be charged along its length through its upper end when the top wall is removed and the coke formed in the chamber may be discharged through its lower end when the bottom wall is removed, and provisions, including heating flues at the sides of the chamber and extending between opposite edges thereof and burners at the opposite ends of the flues for heating said chambers uniformly and in such manner as to maintain substantially uniform pressure conditions in the various heating flues.

2. The combination with a coke oven structure comprising a continuous masonry body portion having formed in it a plurality of horizontally elongated and deep coking chambers arranged side by side, and having removable top and bottom walls for each chamber, whereby each chamber may be charged along its length through its upper end when the top wall is removed, and the coke formed in the chamber may be discharged through its lower end when the bottom wall is removed and having vertical heating flues at the sides of the chambers, and burners at the opposite ends thereof; of tracks arranged above and below the body portion and extending transversely to the lengths of the coking chambers, charging and discharging apparatus running on said tracks and across the upper and lower ends of said chambers, and means for supplying air and gas to said flues in such manner as to maintain substantially uniform pressure conditions in the various heating flues.

3. The combination with a coke oven structure comprising a continuous masonry body portion having formed in it a plurality of retorts or coking chambers, of a heating system for said retorts comprising a plurality of independent heating units, each unit heating only a portion of the total number of retorts, the units having separate waste gas escape stacks and independent air and fuel admission controlling devices.

4. The combination with a coke oven structure comprising a continuous masonry body portion having formed in it a plurality of retorts or coking chambers, of a heating system for said retorts comprising a plurality of independent heating units, each unit heating only a portion of the total number of retorts, each heating unit comprising two regenerators, a set of flues connecting the regenerators, a separate stack for and connected to each regenerator, and two groups of burners operating alternately.

5. In a coke oven structure, a heating unit comprising a pair of regenerative chambers each having an external connection and each being internally connected to the other by a set of parallel heating flues through which the heating gases flow in the same direction during any one stage of the heating operation, the regenerators, flues, and external connections being so arranged that the gas paths between the external connections of the two regenerative chambers through the various flues are all of equal length.

6. In a coke oven structure, a heating unit comprising a pair of regenerative chambers, each having an external connection and each being internally connected to the other by a set of heating flues, and a burner adjacent each end of each flue, the regenerators, flues and external connections being so arranged that the gas paths between the external connections of the two regenerative chambers through the various flues are all of equal length.

7. In a coke oven structure and heating unit comprising a pair of regenerative chambers each having an external connection and each being internally connected to the other by a set of heating flues, and an adjustable burner adjacent each end of each flue, the regenerators, flues and external connections being so arranged that the gas paths between the external connections of the two regenerative chambers through the various flues are all of equal length.

8. In combination in a coke oven structure, a pair of regenerative chambers arranged each with one edge adjacent a corresponding edge of the other and having inlet-outlet passages connected to and extending along their adjacent edges, one of said inlet-outlet passages having an external connection at one end of the chambers and the other passage an external connection at the other end of the chambers, and a set of heating flues connecting said chambers and extending transversely to said inlet-outlet passages and between the remote edges of the regenerative chambers.

9. In combination in a coke oven structure, a pair of regenerative chambers arranged each with one edge adjacent a corresponding edge of the other and having inlet-outlet passages connected to and extending along their adjacent edges, one of said inlet-outlet passages having an external connection at one end of the chambers and the other passage an external connection at the other end of the chambers, and a set of heating flues connecting said chambers and extending transversely to said inlet-outlet passages and between the remote edges of the regenerative chambers, burners at both ends of the heating flues, the burners at one set of flue ends operating alternately with those at the other set of flue ends.

10. In a coke oven structure, a series of horizontally elongated and deep coking retorts arranged side by side, heating flues at the sides of the retorts, and preheating devices arranged between the flues at the sides of each adjacent pair of retorts for preheating the gases entering said flues, and connections whereby said preheating devices are heated by gases which have passed through said flues.

11. In a coke oven structure, a series of retorts arranged side by side, heating flues at the sides of the retorts, a pair of regenerator chambers located between each adjacent pair of retorts, said chambers being connected by heating flues also located between the same pair of retorts, air supply connections and waste gas escape stacks for each of said connected pairs of regenerator chambers independent of the corresponding connections and stacks for every other pair of regenerators.

12. A coke oven structure having a plurality of horizontally elongated and deep retorts arranged side by side, a set of vertical heating flues at the side of each retort, burner chambers adjacent both the upper and lower ends of said set of flues, burners in said chambers, a separate air inlet adjacent each burner, whereby the supply of air adjacent each burner is unaffected by the combustion occurring at any other burner, the burners in the upper and lower chambers operating alternately with each other, and similar connections for supplying air to all of said air inlets.

13. In a coke oven structure, a coking chamber, heating flues therefor extending between opposite edges of the coking chamber, air and gas inlets arranged at each of said opposite edges adjacent the ends of said flues, means for admitting air and gas through the air and gas inlets along one of said edges alternately with the admission of air and gas through the air and gas inlets at the opposite edge, and similar connections for supplying air to all of said air inlets.

14. In a coke oven, a series of retorts arranged side by side, heating flues at each side of each retort, and regenerator chambers located between each adjacent pair of retorts, passages being provided for connecting each regenerator chamber with the adjacent set of flues.

15. In a coke oven, a retort, heating flues at the side of the retort, burners at opposite ends of the flues, a regenerator or regenerators for, and connected to, each set of flue ends, the connections between each regenerator and the corresponding flue ends being substantially equal in length to the connections between the other regenerator and flue ends, and the burners at opposite ends of the flues being operated alternately, said connections including individual ports from said regenerator or regenerators opening adjacent each of the various flue ends.

16. In a coke oven structure, a battery of retorts arranged side by side, and having a set of heating flues at the side of each retort, and a pair of regenerators between each adjacent pair of retorts, one of said regenerators being connected to the upper ends of the corresponding set of flues and the other of said regenerators being connected to the lower ends of the same flues.

17. In a coke oven, the combination of a group of vertical retort heating flues and a pair of regenerator chambers arranged beside said flues and one above the other, the upper regenerator chamber being connected to the upper ends of said flues and the lower regenerator chamber being connected to the lower ends of said flues, and each regenerator chamber having an inlet-outlet passage connected to it along the edge adjacent the other regenerator chamber.

18. In a coke oven, the combination of a group of vertical retort heating flues and a pair of regenerator chambers arranged beside said flues and one above the other, the upper regenerator chamber being connected to the upper ends of said flues and the lower regenerator chamber being connected to the lower ends of said flues, and each regenerator chamber having an inlet-outlet passage connected to it along the edge adjacent the other regenerator chamber, said passages being separated from said flues by a wall thickness greater than that between the bodies of the regenerator chambers and the flues.

19. In a coke oven having two or more retorts arranged side by side, sets of heating flues at the adjacent sides of each adjacent pair of retorts, and a pair of regenerators between the adjacent flues of adjacent retorts and arranged one above the other, the upper of said regenerators being connected to the upper ends of the two sets of flues, and the other regenerator being connected to the lower ends of the same flues, each regenerator having a horizontal passage parallel and closely adjacent to the corresponding passage of the other regenerator, each passage serving as the inlet to or outlet from the two regenerators and connected flues according as the flow of the heating fluid is in one direction or the other through the flues.

20. In a coke oven having two or more retorts arranged side by side, sets of heating flues at the adjacent sides of each adjacent pair of retorts, and a pair of regenerators between the adjacent flues of adjacent retorts and arranged one above the other, the upper of said regenerators being connected to the upper ends of the two sets of flues, and the other regenerator being connected to the lower ends of the same flues, each regenerator having a horizontal passage parallel and closely adjacent to the corresponding passage of the other regenerator, each passage serving as the inlet to or outlet from the two regenerators and connected flues according as the flow of the heating fluid is in one direction or the other through the flues, said passages being narrower than the body of the regenerators to decrease the transfer of heat from the heating flues to the passage serving as an inlet.

21. In a coke oven structure provided with a plurality of retorts and a plurality of regenerative heating units for heating said retorts, an air supply pipe and a gas supply pipe, each running around the coke oven structure and being closed on itself, and each having a plurality of spaced apart admission inlets, each heating unit being connected at each side of the oven structure to each of the air and gas pipes, the two connections to each heating unit from each of said pipes being used alternately.

22. In a coke oven structure provided with a plurality of retorts and a plurality of regenerative heating units for heating said retorts, an air supply pipe and a gas supply pipe, each running around the coke oven structure and being closed on itself, each heating unit being connected at each side of the oven structure to each of the air and gas pipes, the two connections to each heating unit from each of said pipes being used alternately.

23. In a coke oven structure, a plurality of sets of vertical heating flues, a plurality of burners at each end of each set of flues, a gas supply main and pipe connections from the gas main to the burners so arranged that the gas paths between the gas main and the various burners are all of the same length.

24. In a coke oven structure, a plurality of sets of vertical heating flues, a plurality of burners at each end of each set of flues, the upper burners operating alternately in point of time with the lower burners, a gas main surrounding the various sets of flues and arranged midway between the tops and bottoms of the flues, and having a plurality of spaced apart inlet ports, connections of equal lengths between the various burners and the gas main, the upper burners being connected to the portion of the gas main at one side of the oven structure, and the lower burners being connected to the portion of the gas main at the other side of the oven structure.

25. A coke oven structure having a plurality of regenerator chambers, said chambers being coupled together in pairs by heating flues, and a separate smoke stack for and connected to each regenerator chamber, and dampers by which the waste gases from the two regenerators may be caused to escape alternately through first one and then the other of the corresponding stacks.

26. A coke oven structure having a plurality of regenerator chambers, said chambers being coupled together in pairs by heating flues, and a separate smoke stack for and connected to each regenerator chamber, a damper for closing the waste gas escape through each stack, and a damper controlled air inlet into each stack.

27. A coke oven structure having a plurality of horizontally elongated and deep coking retorts, each having a plurality of escape vents for the volatile products of the coking operation formed in the end walls of the retort and open at their inner ends into the interior of said retort at different levels, in combination with means for heating said retorts uniformly and in such manner as to maintain a substantially uniform pressure in the various heating flues, the lowermost of said vents opening into said retorts substantially below the tops of the coking zones in the retorts.

28. A coke oven structure having a plurality of horizontally elongated and deep retorts, each of capacity sufficient to produce twenty tons or more of coke per charge, and having a plurality of upwardly inclined escape vents for the volatile products of the coking operation leading from each end of each retort, and having heating flues at the sides of the retorts, one of said vents at each end of each retort leading from the upper end of the retort and one or more other vents leading from each end of the retort at lower levels, the end walls being provided with portions projecting over the vents leading from the lower levels, thereby preventing clogging of the latter by the material fed into the retorts to be coked, in combination with means for heating said retorts uniformly and in such manner as to maintain a substantially uniform pressure in the various heating flues.

FREDERIC W. C. SCHNIEWIND.

Witnesses:
ROBERT C. METCALFE,
D. W. KINCAID.